United States Patent [19]

Marrello

[11] Patent Number: 4,864,737

[45] Date of Patent: Sep. 12, 1989

[54] SHOCK ABSORBING DEVICE

[76] Inventor: Hugo Marrello, 119 Elgin St., Thornhill, Ontario, Canada, L3T 1W7

[21] Appl. No.: 218,966

[22] Filed: Jul. 14, 1988

[51] Int. Cl.$^4$ .............................................. A43B 13/20
[52] U.S. Cl. ............................................. 36/29; 36/28
[58] Field of Search ................... 36/28, 29, 35 B, 44, 36/43, 71

[56] References Cited

U.S. PATENT DOCUMENTS

| 4,100,686 | 7/1978 | Sgarlato | 36/29 |
| 4,115,934 | 9/1978 | Hall | 36/29 |

FOREIGN PATENT DOCUMENTS

| 3333694 | 3/1985 | Fed. Rep. of Germany | 36/43 |
| 2591441 | 6/1987 | France | 36/29 |
| 792034 | 3/1958 | United Kingdom | 36/28 |
| 210 | 4/1979 | World Int. Prop. O. | 36/44 |

Primary Examiner—Werner H. Schroeder
Assistant Examiner—D. L. Biefeld
Attorney, Agent, or Firm—Smart & Biggar

[57] ABSTRACT

A shock absorbing device comprising: an upper impermeable sheet; a lower impermeable sheet; an intermediate flexible impermeable sheet which is deformed to provide a grid of spaced peaks projecting on each surface thereof, the peaks being fixed to the upper and lower sheets to form two chambers of interconnected pockets, the upper one chamber being filled with a non-compressible liquid and the lower other chamber being filled with a compressible gas, the liquid and the gas being sealed therein.

3 Claims, 1 Drawing Sheet

SHOCK ABSORBING DEVICE

This invention relates to a device for absorbing the shock of an impact force exerted against it, thus offering protection to any object the device covers.

Shock absorbing devices providing a series of pockets filled with a gas or liquid and positioned between two sheets are known. U.S. Pat. No. 2,677,906 issued May 11, 1954 to Arnold Reed discloses a cushioned inner sole for shoes wherein an intermediate sheet is positioned between upper and lower sheets and is corrugated to provide a succession of transverse parallel folds forming pockets that are adapted to remain in position and hold a gas or fluid which cushions the sole of the foot against pressure exerted against the bottom of a shoe. The disadvantage of the Reed patent and other known prior art is that the gas or fluid-holding pockets are unconnected and therefore the cushioning effect may be uneven because the pockets are unconnected, when pressure is exerted against a portion of the sole, the rest of the sole is unable to play a part in assuming any of the load.

The present invention has advantages over the prior art in that it provides improved shock absorption. In this invention, a series of interconnected pockets are formed through the deformation of an intermediate sheet positioned between an upper and lower sheet thus creating two chambers consisting of a series of pockets. The intermediate sheet is deformed in a manner to disperse the pockets in spaced relationship throughout the area of the intermediate sheet in the pattern of a grid. Equally efficient absorption of shock is thus provided throughout the surface of the sheet. When pressure is exerted against one portion of the sole, the free flow of gas or fluid between pockets allows for a compensatory action between pockets and, therefore, an improved cushioning effect.

An additional advantage of this invention is that the chamber abutting one side of the sheet is filled with a noncompressible liquid while the chamber abutting the otherside of the sheet is filled with a compressible gas. When pressure is exerted against laterally a side of the sheet, shock dissapation occurs as the liquid in one chamber is forced, compressing the gas in the other chamber. When the force is removed, the gas acts laterally against the intermediate sheet to force the liquid back to its original position,. The shock absorbing device is therefore protected against compression of the chambers due to the pressure of force over a period of time, making it less prone to unduly early wear and the need for replacement.

In its broadest aspect, the invention consists of a shock absorbing device comprising an upper impermeable sheet, a lower impermeable sheet and an intermediate flexible, impermeable sheet which is deformed to provide a grid of spaced peaks projecting on each surface thereof, the peaks being fixed to the upper and lower sheets to form two chambers of interconnected pockets, one chamber being filled with a non-compressible liquid and the other chamber being filled with a compressible gas, the liquid and the gas being sealed therein. The invention is particularly advantageous for use in the sole of a shoe.

In the accompanying drawings illustrated an example embodiment of the invention:

Figure 1:
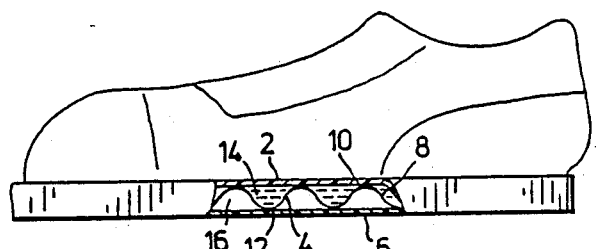
FIG. 1 is a side view, in partial section, illustrating the device used as the sole of a shoe.
Figure 2:
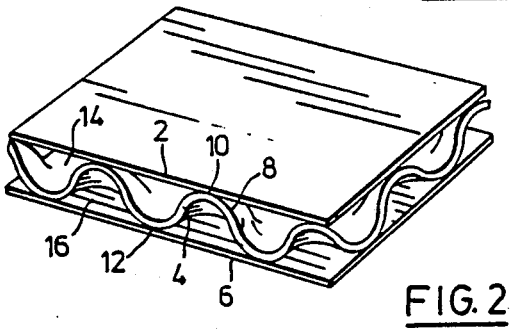
FIG. 2 is a perspective view of a section of the sole of FIG. 1.
Figure 3:
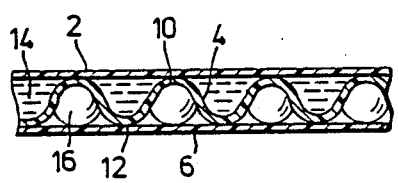
FIG. 3 is a cross-sectional view taken along line 3—3 of FIG. 4.
Figure 4:
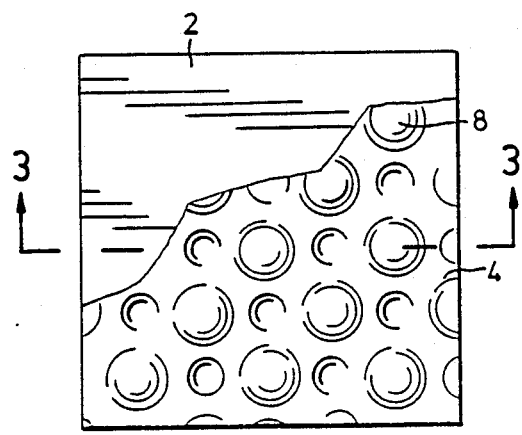
FIG. 4 is a plan view of the section of FIG. 2, partially cut away.

In the embodiment of the invention illustrated, numeral 2 indicates the upper sheet covering an intermediate sheet 4 and a lower sheet 6. Intermediate sheet 4 is deformed in the form of peaks 8 which are attached to the upper sheet at 10 and to the lower sheet at 12, thus forming liquid chamber 14 and a gas chamber 16. The liquid chamber 14 is filled with a non-compressible liquid such as water or oil and the gas chamber 16 are filled with a compressible gas such as air.

In use, when pressure is applied to either or both of the upper sheet 2 and the lower sheet 6, the liquid and gas chambers 14 and 16 are depressed and the gas in the gas chamber 16 is compressed. When the pressure is removed, the gas in the gas chamber 16 once again expands forcing the liquid back into its original position.

I claim:

1. A shock absorbing device comprising:
   (a) an upper impermeable sheet;
   (b) a lower impermeable sheet;
   (c) an intermediate flexible impermeable sheet which is deformed to provide a grid of spaced peaks projecting on each surface thereof, the peaks being fixed to the upper and lower sheets to form two chambers of interconnected pockets, one chamber being filled with a non-compressible liquid and the other chamber being filled with a compressible gas, the liquid and the gas being sealed therein.

2. A shock absorbing device as claimed in claim1 wherein the upper and the lower sheets are also made of a flexible, non-permeable material.

3. For use in a shoe, a sole comprising:
   (a) an upper impermeable sheet;
   (b) a lower impermeable sheet;
   (c) an intermediate sheet which is corrugated to form a grid of spaced peaks projecting from the upper surface thereof, the peaks being fixed to the upper and lower sheets to form two chambers of interconnected pockets, one chamber being filled with a non-compressible liquid and the other chamber being filled with a compressible gas, the liquid and the gas being sealed therein.

* * * * *